C. T. Eames,
Boot Tree,
No. 1,292 Reissued Mar. 25, 1862
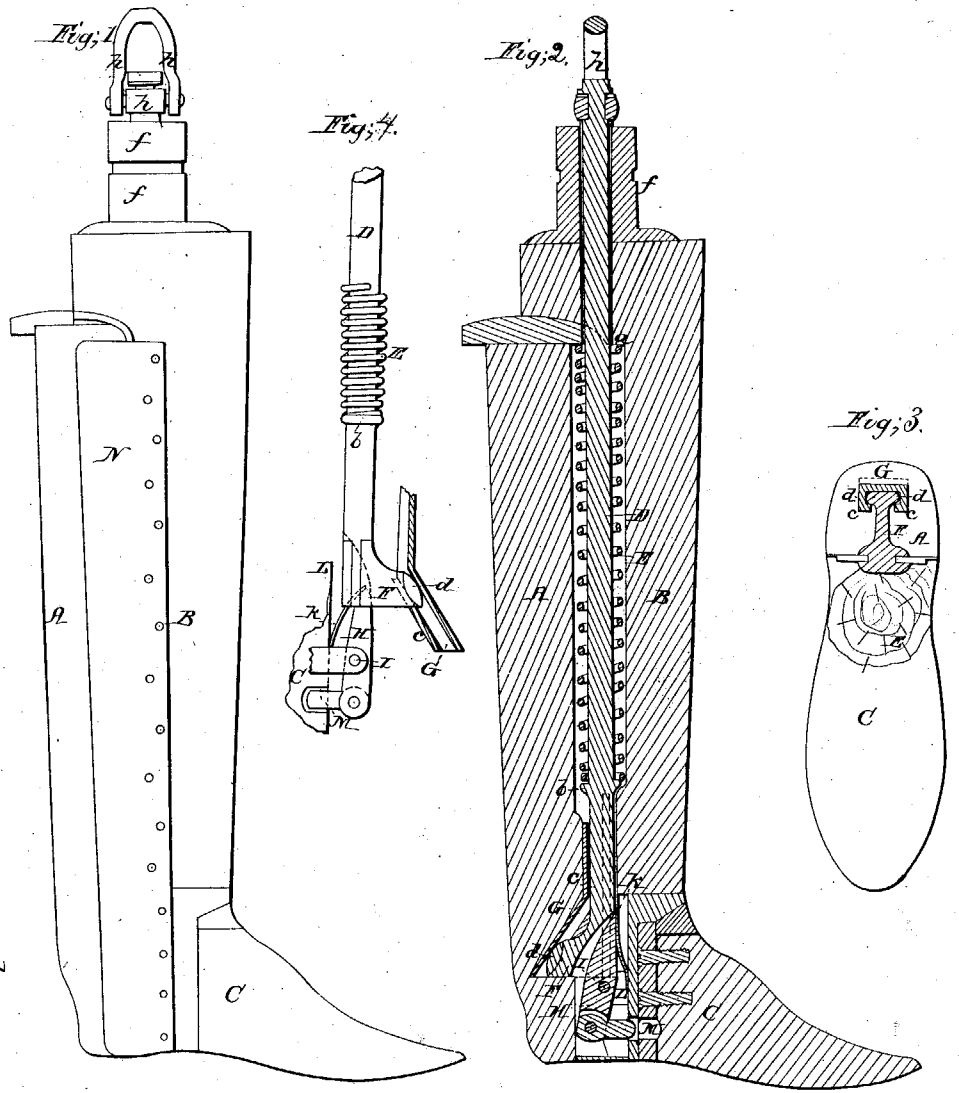
Witnesses:
[illegible]
[illegible]
Inventor:
Chas. T. Eames
per [illegible]
N. PETERS, PHOTO-LITHOGRAPHER, WASHINGTON, D. C.

UNITED STATES PATENT OFFICE.

CHARLES T. EAMES, OF MILFORD, MASSACHUSETTS.

IMPROVEMENT IN BOOT-TREES.

Specification forming part of Letters Patent No. 14,951, dated May 27, 1856; Reissue No. 1,292, dated March 25, 1862.

*To all whom it may concern:*

Be it known that I, CHARLES T. EAMES, of Milford, in the county of Worcester and State of Massachusetts, have invented an Improvement in Boot-Trees; and I do hereby declare that the same is fully described and represented in the following specification and the accompanying drawings, of which—

Figure 1 denotes a side elevation of one of my improved boot-trees; Fig. 2, a vertical central and longitudinal section of the same; Fig. 3, a transverse section taken through its operative cam and inclined plane.

My improvement is not suited to boot trees operated by hand only.

In the drawings, A B indicate, respectively, the back and front of the boot-tree. C is the foot part; *f f*, the journal, to be supported in suitable bearings. Within the front B of the leg and extending out of its upper end is a rod, D, which is enveloped by a helical spring, E, whose ends bear against shoulders *a b*, arranged on the rod and the part B, as seen in Fig. 2. The lower end of the said rod carries a cam or projection, F, which works against an inclined plane, G, formed with lips *c c* to embrace projections *d* on the outer end of the cam F, as seen in Fig. 3. When the cam is moved upward, it will separate the two parts A B. When pressed downward, it will draw them together. The inclined plane is arranged within the leg part A in a position opposite to or at about the same elevation with the instep of the foot of the tree. The cam F will thus work either above or below the level of the instep, or both above and below, and I consider the best position or elevation of the incline to be such that the cam F shall traverse both above and below this level; but I do not confine myself to this precise position, since slight variations therefrom will not essentially affect the action of the tree; but the inclined plane must always be located below the middle of the back A—*i. e.*, nearer to its foot end than its top. The rod D is operated by means of the swiveling link *h*.

In order to maintain the foot C in place on the leg portion B, a bent lever-catch, H, turning on a fulcrum, I, is applied within the leg part B, and arranged with respect to the foot C and the cam F as seen in Fig. 2, the upper arm of the lever H working against a spring, K and an incline, L, the said spring K being arranged as seen in Fig. 2. When the rod D is raised upward, the locking-catch H will be forced by its spring K into a recess, M, formed in the foot C, the catch serving, to confine the foot C to the leg B. During the depression of the rod D and the cam F the catch H will be moved out of the side recess, so as to enable the parts B and G to separate.

In operating with my improved boot-tree, after placing it within the boot the journal is inserted in suitable bearings, and there held while the rod D is pulled or drawn out, so as to move the cam F upward—that is, toward the top of the boot. During the first portion of the movement of the cam F, and owing to its position in the lower or foot end of the tree, it will separate the parts A and B, so as to crowd the foot part C into the foot of the boot and force the heel of the part A close in to the heel of the boot. After this is done, the further elevation of the cam will not only continue the strain upon the leather of the foot, but will separate the two parts A B at their top in such manner as to expand or strain the boot-leg sufficiently. A single traversing wedge, carried by a stretching-rod, which is attached permanently to the front B and moves the wedge longitudinally against an inclined plane, was never before used in a boot-tree, to my knowledge.

Lapping brasses N N are attached by screws to each side of the front B, to cover or bridge over the gap caused by the separation of the parts A B when distended, and by means of a set-screw fastened to the front B, at or near its top, and extending backward therefrom through a slot in the top of the back A, the expansion of the back A may be checked or stopped by a nut on the screw, so as not to pass beyond the lapping brasses, and the extent of expansion of the tree at its top limited or regulated. These devices are not new nor claimed as such. No check or stop is necessary in my tree.

When, in treeing a boot, the same degree of strain is brought to bear simultaneously throughout its length from top to bottom, the weakest parts are of course subjected to all the force or strain necessary to fill and distend the strongest parts, and much injury is caused by the bursting or tearing of the boot in its top, where it is usually weakest. This result follows from the use of two or more wedges or levers placed in different positions to expand a boot-tree equally throughout its entire length, and no machine boot-tree heretofore used, so far as I am aware, is free from this objection. In order to remedy this defect in boot-trees, and to furnish a boot-tree which will adapt itself to the varying forms of boot-legs more perfectly than any heretofore used, and to graduate the force employed according to the requirements of the different parts of the boot, I have contrived my improved boot-tree, which operates so as to strain the foot of the boot first, and to employ the foot (it being the strongest part of the boot) as a fulcrum for the leverage which may be employed to expand the leg portion. In this way I avoid all danger of bursting open the side seams of the leg, and am enabled, after straining the foot, to bring sufficient strain upon the leg portion of the boot without bringing so much force to bear directly upon that part of the boot as is required in the foot part.

I do not claim the employment of two levers or cams arranged so as to operate simultaneously against both the upper and lower parts of the leg of a boot-tree; but

What I claim as my invention, and desire to secure by Letters Patent, is—

A boot-tree distended by means of a single cam or wedge attached to a stretching-rod, D, at its lower end, and traversing upon an inclined plane located in the back A at or near its lower end, the same operating substantially in the manner as above set forth.

CHAS. T. EAMES.

Witnesses:

F. A. BROOKS,

J. R. BAMPTON.